United States Patent [19]

Ostertag et al.

[11] 4,328,042

[45] May 4, 1982

[54] PREPARATION OF METALLIC PIGMENTS HAVING A METALLIC LUSTER

[75] Inventors: Werner Ostertag, Gruenstadt; Knut Bittler, Speyer; Gustav Bock, Neustadt, all of Fed. Rep. of Germany

[73] Assignee: BASF Aktiengesellschaft, Fed. Rep. of Germany

[21] Appl. No.: 215,759

[22] Filed: Dec. 12, 1980

[30] Foreign Application Priority Data

Jan. 31, 1980 [DE] Fed. Rep. of Germany ....... 3003352

[51] Int. Cl.$^3$ ............................................... C09C 1/22
[52] U.S. Cl. ................................ 106/308 B; 106/304; 427/216; 427/255.3; 427/213
[58] Field of Search ........................... 106/308 B, 304; 427/216, 255.3; 423/247, 417

[56] References Cited

U.S. PATENT DOCUMENTS

| | | | |
|---|---|---|---|
| 2,839,423 | 0/1958 | Homer et al. | 427/216 |
| 3,220,875 | 0/1965 | Queneau | 427/216 |
| 3,342,587 | 0/1967 | Goodrich et al. | 427/216 |
| 3,918,985 | 11/1975 | Ebenhoech et al. | 423/417 |

FOREIGN PATENT DOCUMENTS

| | | | |
|---|---|---|---|
| 2210279 | of 1973 | Fed. Rep. of Germany | 106/304 |
| 2344196 | of 1975 | Fed. Rep. of Germany | 106/304 |

*Primary Examiner*—Carl F. Dees
*Assistant Examiner*—Margaret B. Medley
*Attorney, Agent, or Firm*—Keil & Witherspoon

[57] ABSTRACT

To prepare a colored pigment which has a metallic luster and consists of a metallic core whose surface is at least partially covered with an iron oxide, iron pentacarbonyl is oxidized with oxygen in a fluidized bed of the metallic cores at above 100° C. The amount of iron pentacarbonyl vapor introduced into the fluidized bed must not exceed 5% by volume, based on the total gases introduced into the fluidized bed over the same period of time.

6 Claims, No Drawings

PREPARATION OF METALLIC PIGMENTS HAVING A METALLIC LUSTER

The present invention relates to a process for the preparation of colored pigments having a metallic luster.

Interest is growing in the use of metallic effects in surface coatings, and also in the coloration of plastics and in colorant dispersions.

The procedure followed in industry in order to produce a metallic-effect surface coating is to disperse both a metallic pigment and a transparent colored pigment in the finish. The metallic pigment used is in the main aluminum flake, and the transparent colored pigment is in the main iron oxide, because of its heat resistance and ultra-violet resistance.

In order to achieve the optical effects, shown by a combination of the transparent oxide and the metallic pigment, with only a single pigment-which would offer advantages in the production of the pigmented surface coating, since only one pigment would have to be dispersed-attempts have in the past been made to precipitate the iron oxide directly from aqueous solution onto an aluminum pigment (J 54-81337). This gives a golden pigment having a metallic luster.

However, it is a disadvantage of the process that aluminum pigments react very readily in aqueous media, so that it is extremely difficult to obtain pigments having reproducible properties. The process has the further disadvantage that it must be carried out within a limited pH range and in the presence of expensive complexing additives. Furthermore, extremely dilute solutions (preferably containing from 0.0001 to 0.02 mole of iron oxide per liter) must be employed, which, at the very least, is a major handicap in the industrial production of the pigment. The complicated coating procedure is followed by other laborious processes such as filtration, washing and drying of the coated pigment.

It is an object of the present invention to provide a process for the preparation of colored pigments which have a metallic luster and consist of a metallic core whose surface is at least partially covered with an iron oxide, whereby pigments having reproducible properties can be obtained, and which can, without difficulty, be carried out on a major production scale.

We have found that this object is achieved by a process wherein iron pentacarbonyl is oxidized to iron oxide and carbon dioxide in a fluidized bed of the metallic cores with oxygen at above 100° C. and the amount of iron pentacarbonyl vapor introduced into the fluidized bed does not exceed 5% by volume, based on the total gases introduced into the fluidized bed over the same period of time.

To carry out the process according to the invention, the metallic cores are first introduced into a fluidized bed reactor and preheated to the desired reaction temperature, which should be not less than 100° C., so as to ensure rapid conversion of the iron carbonyl to iron oxides, especially to $Fe_2O_3$. To achieve the formation of very uniform $Fe_2O_3$ coatings, it is advantageous if the reaction temperature is not excessively high, ie. if it is not allowed to rise to above 400° C. In general, the reaction is carried out at from 150° to 300° C. If the heat of reaction of the iron carbonyl oxidation is insufficient to maintain the desired temperature in the fluidized bed reactor, it is readily possible to supply the required heat extraneously, for example by heating coils provided in the reactor, or by infrared radiators. The metallic cores employed are pulverulent metal particles of very uniform size. Appropriate particle sizes are from 1 to 200 μm. The particles employed are advantageously flakes, since these produce the best metallic effects. The metallic cores can in principle consist of any metals which can be produced in the above shape and still have a metallic luster. In particular, it is possible to use particles of copper and its alloys, eg. brass or bronze, ie. alloys of copper with zinc and/or tin, but especially aluminum and its alloys, e.g. with copper, such as aluminum bronze.

After the metallic cores initially introduced into the fluidized bed reactor have been heated to the desired temperature, they are fluidized with an inert gas, for example nitrogen, argon or some other gas which is inert toward the reactants, and the iron pentacarbonyl vapor is then introduced into the reactor. The oxygen required for the oxidation is advantageously admixed to the fluidizing gas. The carbonyl vapor can be diluted with an inert gas; it is essential that the amount of carbonyl vapor introduced into the fluidized bed reactor (calculated under normal conditions of temperature and pressure, ie. 20° C. and 760 mm Hg) should not exceed 5% by volume, based on the gases introduced into the fluidized bed over the same period of time, ie. fluidizing gas, combustion air and diluent gases.

Advantageously, the iron pentacarbonyl concentration employed is from 0.1 to 2.5% by volume. If the concentration substantially exceeds 5% by volume, reproducible coating, ie. the production of pigments having reproducible properties, is no longer possible.

The hue of the pigments obtained can be varied deliberately and reproducibly from pale golden yellow to dark violet, depending on the duration of the treatment according to the invention, the concentration of iron pentacarbonyl vapor, and the ratio of iron pentacarbonyl vapor passed in to metallic cores initially introduced. Of course, the hue also depends on the particle size and/or surface area of the metallic cores initially introduced. In general, the pigments contain from 0.5 to about 15% by weight of $Fe_2O_3$.

The pigments prepared by the process according to the invention can be used direct, without further after-treatment. They can, without any difficulty, be produced in a reproducible hue, and can easily be dispersed in finishes.

EXAMPLE 1

150 g of flake-like aluminum cores (mean size of the largest diameter 50 μm) are introduced into a fluidized bed reactor made of glass and equipped with a quartz frit bottom (internal diameter 60 mm), and are fluidized by means of a stream of gas. The aluminum pigment has a surface area of 2 m²/g. The stream of gas (300 l/h) required for fluidization comprises 200 l/h of nitrogen and 100 l/h of air. The temperature in the fluidized bed is raised to 200° C. by infrared radiators arranged around the fluidized bed.

Carbonyl vapor, together with nitrogen, is then introduced into the fludized bed via a two-flow nozzle located immediately above the frit. The carbonyl vapor is produced in a vaporizer and is conveyed from there to the nozzle by means of a carrier gas (100 l of $N_2$/h). This stream of gas containing the carbonyl is injected through the nozzle with a further 100 l/h of nitrogen. In this way, a total of 58.2 g per hour of iron pentacarbonyl are introduced into the reactor, corresponding to 1.3% by volume of Fe(CO)₅, based on the combined volume of the other gases introduced into the reactor. After a period of 1.5 hours, the originally silver-gray aluminum pigment has become golden yellow, whilst after a further hour it is reddish golden.

The pigment, which has a metallic luster, is ground with an alkyd-melamine resin finish (DIN Draft 53,238) and the dispersion is then knife-coated onto a substrate, giving a pigmented film which exhibits a metallic effect. The golden surface coating is brilliant and has a pure hue.

EXAMPLE 2

A series of similar coating experiments is carried out in the apparatus described in Example 1, varying the nature and particle size of the metallic pigment employed, the amount of fluidizing gas introduced into the reactor, the temperature and the coating time. In all the experiments, 14 g per hour of iron pentacarbonyl are introduced into the reactor with 200 l/h of nitrogen as the carrier gas.

The experimental data are listed in the Table which follows.

face with iron oxide, which can be correlated with the color change. All the pigments are very easily dispersible in finishes. The pigmented colored surface-coating films produced by knife-coating of the dispersions show very marked metallic effects.

We claim:

1. A process for the preparation of colored pigments which have a metallic luster and consist of a metallic core whose surface is at least partially covered with an iron oxide, wherein iron pentacarbonyl is oxidized to iron oxide in a fluidized bed of the metallic cores with oxygen at above 100° C. and the amount of iron pentacarbonyl vapor introduced into the fluidized bed does not exceed 5% by volume, based on the total gases introduced into the fluidized bed over the same period of time.

2. A process as claimed in claim 1, wherein the oxidation is carried out at below 400° C.

3. A process as claimed in claim 1 or 2, wherein the oxidation is carried out at from 150° to 300° C.

4. A process as claimed in claim 1, wherein the metallic cores employed consist of copper or aluminum or a copper alloy or aluminum alloy.

| Experiment number | Pigment employed | Amount of fluidizing % gas Mean | Air in l/h | N₂ in l/h | % by volume of Fe(CO₅)*based on the other gases introduced into the reactor | Temperature of fluidized bed in °C. | Duration of experiment in hours | Color of product | % by weight of Fe₂O₃ in the pigment |
|---|---|---|---|---|---|---|---|---|---|
| 1 | Aluminum (flake) | 25 | 100 | 200 | 0.32 | 160 | 4 | pale yellow | 1.1 |
| 2 | Aluminum (flake) | 25 | 100 | 200 | 0.32 | 180 | 4 | light golden | 3.3 |
| 3 | Aluminum (flake) | 30 | 120 | 200 | 0.31 | 200 | 4 | reddish golden | 6.4 |
| 4 | Aluminum (flake) | 30 | 150 | 200 | 0.29 | 220 | 4 | reddish violet | 12.0 |
| 5 | Aluminum (flake) | 35 | 150 | 200 | 0.29 | 250 | 4 | violet | 16.0 |
| 6 | Aluminum (flake) | 10 | 100 | 100 | 0.40 | 230 | 5 | violet | 15.7 |
| 7 | Aluminum (flake) | 10 | 100 | 100 | 0.40 | 230 | 3 | golden red | 9.2 |
| 8 | Aluminum (flake) | 25 | 50 | 300 | 0.29 | 250 | 2 | reddish golden | 6.1 |
| 9 | Copper (flake) | 60 | 100 | 200 | 0.32 | 220 | 1 | red | 2.9 |
| 10 | Aluminum (flake) | 25 | 200 | — | 0.40 | 250 | 1 | light golden | 3.0 |
| 11 | Aluminum (flake) | 25 | 200 | — | 0.40 | 250 | 3 | golden red | 8.8 |
| 12 | Aluminum (flake) | 25 | 200 | — | 0.40 | 250 | 4 | reddish violet | 12.1 |

The data in the Table show that with increasing Fe₂O₃ content the Al pigment progresses from pale yellow through light golden, reddish golden and red to a final violet color. All the pigments have a metallic luster. Electron micrographs of Samples 1 to 5 and 10 to 12 clearly show the increasing covering of the Al sur- 5. A process as claimed in claim 1, wherein the metallic cores have a particle size of from 1 to 200 μm.

6. A process as claimed in claim 1, wherein the metallic cores have a flake structure.

* * * * *